(No Model.)
G. F. ATWOOD.
WIRE TUBULAR BEARING FOR SUSPENDER ENDS.
No. 332,178. Patented Dec. 8, 1885.
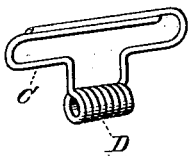
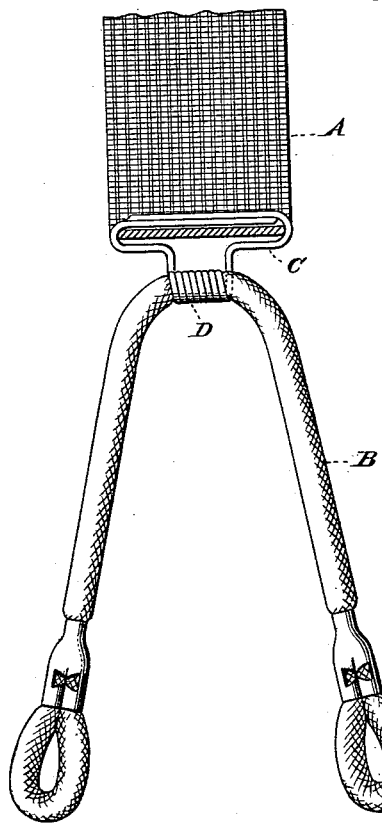
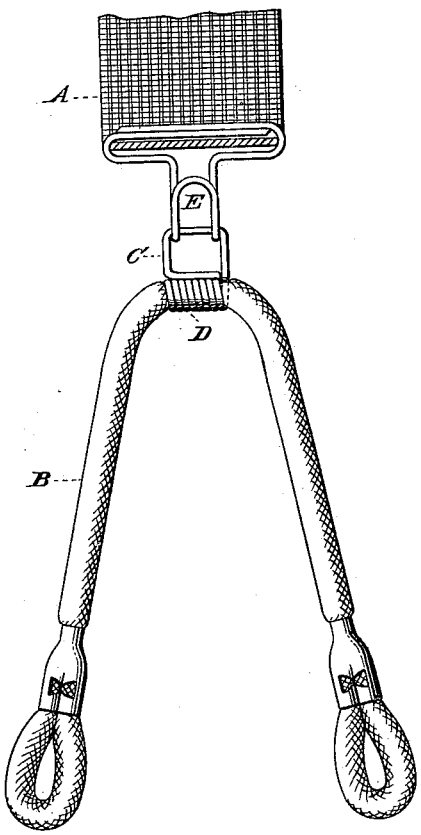
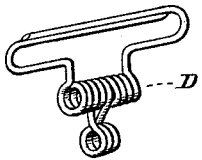
WITNESSES
Villette Anderson.
Ben. Fugitt.
INVENTOR
Geo. F. Atwood
by Anderson & Smith
his ATTORNEYS

UNITED STATES PATENT OFFICE.

GEORGE FRENCH ATWOOD, OF SWANTON, VERMONT, ASSIGNOR OF ONE-HALF TO JEDEDIAH D. BEEMAN, OF MORIAH, NEW YORK.

WIRE TUBULAR BEARING FOR SUSPENDER-ENDS.

SPECIFICATION forming part of Letters Patent No. 332,178, dated December 8, 1885.

Application filed September 21, 1885. Serial No. 177,720. (No model.)

*To all whom it may concern:*

Be it known that I, GEORGE F. ATWOOD, a citizen of the United States, residing at Swanton, in the county of Franklin and State of Vermont, have invented certain new and useful Improvements in Wire Tubular Bearings for Suspender-Ends; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a perspective view. Fig. 2 is a front view, showing also the end of the suspender-band and the cord. Fig. 3 is a similar front view, and shows a modification. Fig. 4 is also a modification, shown in perspective.

This invention has relation to devices for connecting the cords of suspenders to the bands; and it consists in the construction and novel arrangement of parts, as will be hereinafter fully described, and pointed out in the appended claims.

In the accompanying drawings, the letter A designates the end of a suspender-band, and B the cord. C is a wire loop having the tubular portion D below the loop, said tubular portion consisting of spirally-coiled wire, the whirls of which are close together, forming a tubular bearing for the cord. This coiled-wire tube is well adapted to form a bearing for the cord, as it affords some friction sufficient to hold the cord to its adjustment when not in actual use upon the person, and allows the required movement to the cord when in service. The friction of the wire tube is not sufficient to cause wear of the cord, because of the rounded surface of the wire.

In making the cord-loop it is preferred to make a single piece of wire, the coiled tubular portion D being formed first, and the end or ends being bent to form the loop portion C, and secured by solder or otherwise. Usually the loop part C is made broad enough to receive the suspender-band A; but it may be made more narrow, and an independent band-loop employed to form the connection, said band-loop having a hook, as at E, to engage said loop part. Sometimes a smaller wire coil may be made below the coil-tube D to receive a cord from the drawers.

Having described this invention, what I claim, and desire to secure by Letters Patent, is—

1. A cord-loop for suspenders, having the coiled-wire tubular bearing D for the cord, substantially as specified.

2. A cord-loop for suspenders, having the spirally-coiled tubular bearing for the cord, and an attaching-loop formed entire from a single piece of wire, substantially as specified.

In testimony whereof I affix my signature in presence of two witnesses.

GEORGE FRENCH ATWOOD.

Witnesses:
HOTIA W. FARRAR,
RIGNEY D. MARVIN.